(12) United States Patent
Caputo et al.

(10) Patent No.: US 6,740,755 B2
(45) Date of Patent: May 25, 2004

(54) PROCESS AND METHOD FOR THE PREPARATION OF ASYMMETRIC MONOFUNCTIONALIZED INDOCYANINE LABELLING REAGENTS AND OBTAINED COMPOUNDS

(76) Inventors: Giuseppe Caputo, Via Principe Tommaso 21, I-10125 Turin (IT); Leopoldo Della Ciana, Via Torino 475, I-10015 Ivrea (Turin) (IT)

( * ) Notice: Subject to any disclaimer, the term of this patent is extended or adjusted under 35 U.S.C. 154(b) by 0 days.

(21) Appl. No.: 09/995,350

(22) Filed: Nov. 27, 2001

(65) Prior Publication Data

US 2002/0065421 A1 May 30, 2002

(30) Foreign Application Priority Data

Nov. 28, 2000 (EP) .............................. 00126019

(51) Int. Cl.⁷ ............................................ C07D 239/24
(52) U.S. Cl. ...................................................... 544/310
(58) Field of Search .......................................... 544/310

(56) References Cited

FOREIGN PATENT DOCUMENTS

| DE | 19921234 A1 | 11/2000 | ........... C09B/23/08 |
|----|-------------|---------|-----------------------|
| GB | 355693 | 2/1930 | |
| WO | WO97/13810 | 4/1997 | ........... C09B/23/00 |

OTHER PUBLICATIONS

Frances M. Hamer, "Some Unsymmetrical Pentamethincyanine Dyes and Their Tetramethin Intermediates," *J. Chem. Soc.* 32:32–37 (1949).

Lindsey et al., "Visible Light–Harvesting in Covalently–Linked Porphyrin–Cyanine Dyes," *Tetrahedron* 45:15 4845–4866 (1989).

European Search Report for Application No. EP 00 12 6019; Date of Completion: Jun. 29, 2001.

Mank et al., "Visible Diode Laser–Induced Fluorescence Detection in Liquid Chromatography after Precolumn Derivatization of Amines," *Anal. Chem.*, 67: 1742–1748 (1995).

Mujumdar et al., "Cyanine Dye Labeling Reagents Containing Isothiocyanate Groups," *Cytometry*, 10(1): 11–19 (1989).

Mujumdar et al., "Cyanine Dye Labeling Reagents: Sulfoindocyanine Succinimidyl Esters," *Bioconjugate Chemistry*, 4(2): 105–111 (1993).

*Primary Examiner*—Rita Desai
*Assistant Examiner*—Kamal Saeed
(74) *Attorney, Agent, or Firm*—Myers Bigel Sibley & Sajovec, PA (57) ABSTRACT

A process for preparing an asymmetrical indocyanine dye comprising the steps of:

a) reacting a first quaternised indolenine or substituted indolenine with a compound of the formula (II)

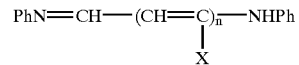

or hydrochloride thereof, wherein n is 0 or 1 Ph is phenyl or substituted phenyl X is hydrogen, halogen or alkyl, preferably chlorine, in a solvent selected from the group consisting of acetic acid, acetic anhydride and mixtures thereof in the presence of acetyl chloride, to obtain an intermediate hemicyanine, and b) further reacting said intermediate hemicyanine with a second quaternised indolenine or substituted indolenine different from said first indolenine.

8 Claims, 11 Drawing Sheets

PROCESS AND METHOD FOR THE PREPARATION OF ASYMMETRIC MONOFUNCTIONALIZED INDOCYANINE LABELLING REAGENTS AND OBTAINED COMPOUNDS

CROSS-REFERENCE TO RELATED APPLICATIONS

This application claims priority from European Patent Application No. 00126019.9, filed in English on Nov. 28, 2000, the disclosure of which is incorporated by reference herein in its entirety.

FIELD AND BACKGROUND OF THE INVENTION

Figure 1:
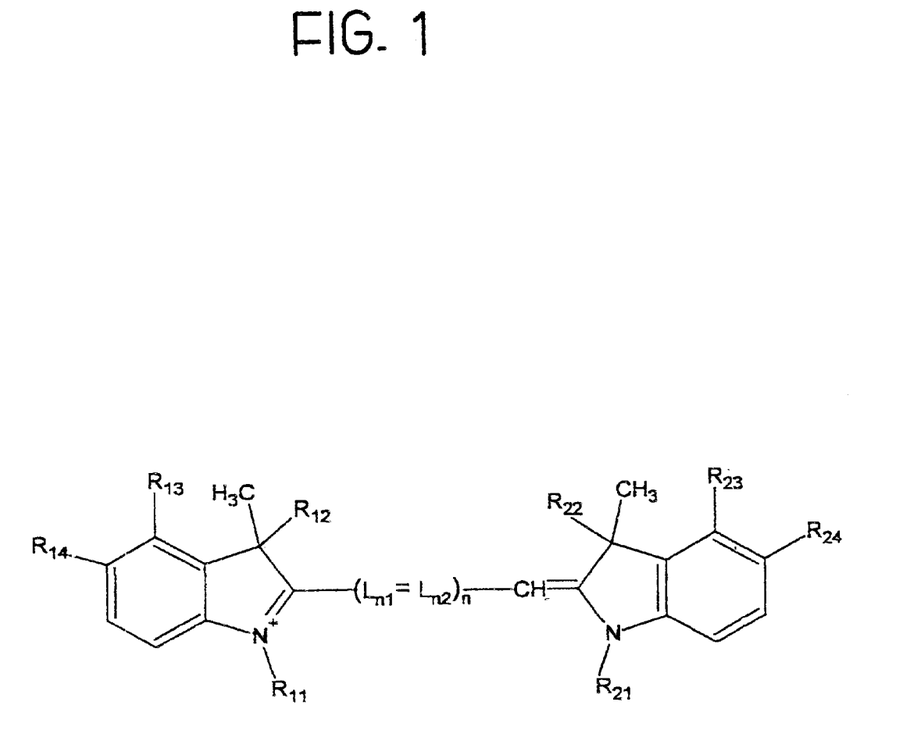
FIG. 1 is a general formula of indocyanine dyes.

Indocyanine dyes conform to the generalised formula:

where $R_{11}$, $R_{12}$, $R_{13}$, $R_{14}$, $R_{21}$, $R_{22}$, $R_{23}$ and $R_{24}$ are either hydrogens or substituents; the substituent couples $R_{13}$, $R_{14}$ and/or $R_{23}$, $R_{24}$ can form a condensed benzene ring, in turn bearing substituents; n=1–3; $L_{n1}$, $L_{n2}$ are either methines (C—H) or substituted methines (C—R).

Comprehensive reviews regarding indocyanine dyes have been written by Frances M. Hamer, "The Chemistry of Heterocyclic Compounds", vol. 18, "The Cyanine Dyes and Related Compounds", Weissberger Ed., Wiley Interscience, New York, (1964); D. M. Sturmer, "The Chemistry of Heterocyclic Compounds", "Special Topics in Heterocyclic Chemistry", chapter VIII, "Synthesis and Properties of Cyanine and Related Dyes", Weissberger Ed., Wiley, N.Y., (1977); "The Kirk-Othmer Encyclopaedia of Chemical Technology" vol. 7, p. 782, "Cyanine Dyes", Wiley, N.Y., (1993).

For many years, indocyanine dyes have been very useful as sensitisers in photography, especially in the red and near infrared regions of the spectrum. However, in more recent years, there has been an upsurge of new uses of these dyes in innovative technological areas, such as laser and electro-optic applications, optical recording media, medical, biological and diagnostic. These new applications of indocyanine dyes place high demands on the degree of purity required, and the reproducibility of synthetic methods and purification steps is very important. These requirements are especially stringent for dyes designed to improve detection of ribonucleic acid (RNA), deoxyribonucleic acid (DNA) and of antigens in immunoassays. In these fields, the trend toward an increasing miniaturisation is accompanied by an increasing demand on sensitivity of the reporter molecules or labels. One way to increase the sensitivity of conventional fluorescence method is to use laser sources for the excitation. However, traditional fluorescent labels based on fluoresceins or rhodamines required expensive and/or bulky lasers. Moreover, their fluorescence occurs in the blue-green to green regions of the visible spectrum, where interference from the sample matrix is more likely to occur. Indocyanine dyes do not suffer from these limitations. They can be efficiently excited by means of small, inexpensive solid state devices such as laser diodes or light emitting diodes, with extinction coefficients often several times higher than fluoresceins and rhodamines; they emit in the red and near-infrared regions of the spectrum, where non-specific fluorescence from the sample is low or lacking; another sources, Raman noise, becomes smaller with the inverse fourth power of wavelength.

To be useful as a label, a dye has to be provided with a suitable side chain containing a functional group. While the main part of the dye structure is generally known from previous applications, the introduction of a functional group into the structure for the purpose of conjugation, or binding to another molecule, represents the innovative step in the inventions concerning the use of the dye as a labelling reagent. In general, only one such functionalised side arm is preferable, in order to avoid cross-linking or purification problems. With a few exceptions, limited to heptamethine dyes, the standard approach in the design of indocyanine labelling reagents has been to attach the functionalised side arm to one of the heterocyclic nuclei of the dye:

$HET_1$—$HET_2$—Z

See, for instance: J. S. Lindsey, P. A. Brown, and D. A. Siesel, "Visible Light-Harvesting in Covalently-Linked Porphyrin-Cyanine Dyes", Tetrahedron, 45, 4845, (1989); R. B. Mujumdar, L. A. Ernst, Swati R. Mujumdar, C. J. Lewis, and A. S. Waggoner, "Cyanine Dye Labelling Reagents: Sulfoindocyanine Succinimidyl Esters", Bioconjugate Chemistry, 4, 105, (1993); G. Mank, H. T. C. van der Laan, H. Lingeman, Cees Goojer, U. A. Th. Brinkman, and N. H. Velthorst, "Visible Diode Laser-Induced Fluorescence Detection in Liquid Chromatography after Precolumn Derivatization of Amines", Anal. Chem., 67, 1742, (1995).

The general synthetic strategy necessary to prepare these labelling reagents is as follows. First, a quaternised nitrogen heterocycle $HET_1$ is prepared. Then, this heterocyclic base is reacted with an electrophilic reagent such as PhNH—(CH=CH)$_n$—CH=NHPh.HCl or RO—(CH=CH)$_n$—CH(OR)$_2$, where Ph is a phenyl ring and R a methyl or ethyl group, to obtain a so-called hemicyanine dye, $HET_1$—(CH=CH)$_n$NHPh/$HET_1$—(CH=CH)$_n$NAcPh, where Ac is the acetyl radical or $HET_1$—(CH=CH)$_n$—OR. These intermediates are then reacted with a different quaternary nitrogen heterocycle, $HET_2$. The functionalised side arm can be attached either to the first or to the second quaternised nitrogen heterocycle. The final result is an asymmetric polymethine labelling reagent, $HET_1$—(CH=CH)$_n$—$HET_2$—Z.

Figure 2:
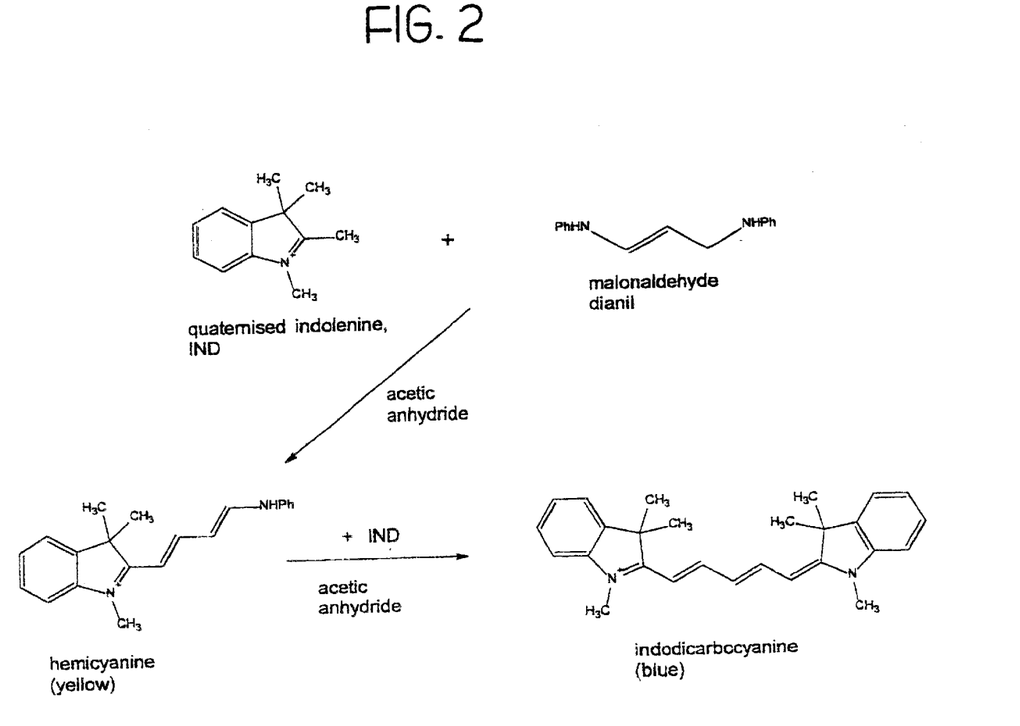
FIG. 2 is a scheme of the prior art process for preparing indocyanines.

Unfortunately, the hemicyanine intermediates are notoriously difficult to obtain in good yields and/or in a pure form. For example, the condensation of N-methyl-2,3,3-trimethyl [3H]indolium iodide with malonaldehyde dianil monochloride in acetic anhydride is said (Piggott and Rodd, BP 355,693/1930) to give rise to a green intermediate, indicating a strong contamination of the desired, yellow hemicyanine intermediate (yellow) with symmetric, blue indocyanine dye, FIG. 2. Moreover, when F. M. Hamer, in "Some Unsymmetrical Pentamethincyanine Dyes and their Tetramethin Intermediates" tried to prepare a pure sample of the same hemicyanine intermediate, obtained it in an 8% yield, after a lengthy and wasteful procedure based on multiple extractions and precipitations. More recently, R. B. Mujumdar, L. A. Ernst, Swati R. Mujumdar, C. J. Lewis, and A. S. Waggoner, in "Cyanine Dye Labelling Reagents: Sulfoindocyanine Succinimidyl Esters", Bioconjugate Chemistry, 4, 105, (1993) described the synthesis of hemicyanine intermediates for the preparation of sulfoindocyanine dyes active esters, useful as labelling reagents. One intermediate was obtained by condensing 1-ethyl-2,3,3-trimethyl[3H]indolium-5-sulfonate with N,N'-diphenylformamidine in acetic acid for four hours. While the reported yield of the crude compound was 30%, the carboindocyanine dyes prepared from it were obtained only in 25% and 5% yields, after extensive purification by reverse phase HPLC chromatography. Similarly, the condensation of 1-ethyl-2,3,3-trimethyl[3H]indolium-5-sulfonate with malonaldehyde dianil hydrochloride in a mixture of acetic acid and acetic anhydride at reflux for four hours was said to produce the corresponding hemicyanine intermediate in an unreported yield. Again, the yields of the dicarboindocyanine dyes obtained from these intermediates were very low (5%). In fact, when Mank (Anal. Chem., 67, 1744) tried to synthesise the same dicarbocyanine label described in the previous reference he obtained a total yield of 18% of dicarbocyanines, from which the desired product was difficult to separate. He then devised an alternative approach based on 1,3,3-trimethoxypropene. Unfortunately, this chemical is no longer available commercially. Similar difficulties were encountered by us when trying to repeat the syntheses indicated above.

For these reasons it became necessary to investigate more carefully the technique employed to prepare the required hemicyanine intermediates and the properties of the latter. We thus discovered two main sources of trouble. The first was the formation of symmetrical indocyanine dye in variable and often erratic amounts in the condensation step. The other complication arose from the reversibility of this reaction. For example, when a pure sample of hemicyanine intermediate was exposed to the same conditions used for the formation of the asymmetric cyanine dye, namely to a base such as acetate, pyridine or triethylamine, formation of symmetric dye was observed. This phenomenon was more evident with the more reactive quaternised indolenines.

The steps we took to deal with these problems are described in details in the next section.

DETAILED DESCRIPTION OF THE INVENTION

Figure 3:
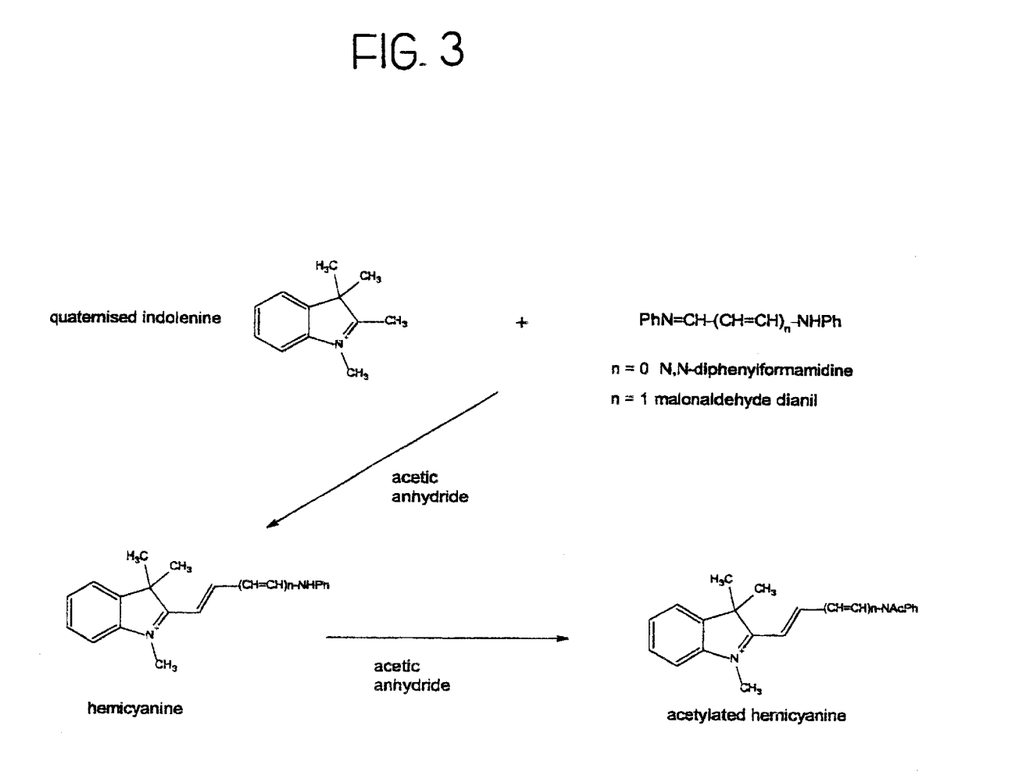
FIG. 3 is a scheme of the prior art process for preparing hemiindocyanines.

When a quaternised indolenine is reacted with N,N'-diphenylformamidine in acetic acid, or acetic acid anhydride, or a mixture of these two solvents a hemicyanine is formed. This hemicyanine can be present in two forms, one in which the terminal anil group (NH-phenyl) is free and the other one where it is acetylated, NAc-phenyl, FIG. 3. The two forms have different UV-visible absorptions and can be easily differentiated. Even when acetic anhydride alone is used, some non acetylated hemicyanine is often formed. Similar observations apply to the reaction of quaternised indolenine with the vinilogs of N,N-diphenylformamidine, e.g. malonaldehyde dianils. Our initial aim in the optimisation of this reaction was the obtainment of only one of the two forms of hemicyanine, the acetylated form. We thought the addition of a stronger acetylating agent, such as acetyl chloride to the acetic anhydride solvent would be more effective in achieving the complete acetylation of the hemicyanine. Surprisingly, not only our assumption turned out correct, but, more importantly, the addition of acetyl chloride completely inhibited the formation of symmetric cyanine dye. Therefore, one aspect of our invention lies in the addition of variable amounts of acetyl chloride to the acetic anhydride solvent used for the preparation of hemicyanine. The amount of acetyl chloride can vary from 0.5% to 50%, with a preferred range from 1% to 20%.

In a further aspect of our invention, we developed a purification method of the intermediate hemicyanine by means of continuous extraction of the crude product with a suitable solvent. Such solvent should extract any unreacted N,N-diphenylformamidine or malonaldehyde dianil or substituted derivatives thereof, without contemporaneous dissolution of the hemicyanine. Preferred solvents are ethyl acetate, methylene chloride, chloroform, 1,1,1-trichloroethane and other chlorinated solvents. Methods for continues extraction include Soxhlet extraction or similar liquid-solid extractions, or liquid-liquid extractor; the latter can be in either of two forms, namely, the extracting liquid can be either lighter or heavier than the liquid containing the hemicyanine to be purified, either in solution or in a suspension. When the hemicyanine is present in a suspension, the density of the hemicyanine should be lower than the extracting solvent.

In yet another aspect of our invention, we designed a general strategy for the synthesis of asymmetric cyanine dyes to be used as labelling reagents. As we have seen previously, one of the complications present in these syntheses is the reversibility of the intermediate hemicyanines, especially when the second quaternised indolenine is less reactive then the first. In this case, large amount of symmetric hemicyanine, $HET_1$-$HET_1$ form, contaminating the desired $HET_1$-$HET_2$ product. The separation of the two products is often difficult to achieve, especially when the indolenine nuclei are similar. Of the different indolenines employed in these syntheses, the more reactive are those not bearing electron withdrawing groups in the benzene ring or with additional condensed benzene rings and with simple alkyl chains attached to the quaternary nitrogen. A decrease in reactivity is observed when these cyanines bear carboxylalkyl or sulfonatoalkyl chains or electron withdrawing groups in the benzene ring, such as sulfonic or carboxylic groups. A similar decrease in reactivity is also observed with cyanines bearing additional condensed benzene rings. The least reactive cyanines are those with additional condensed benzene rings bearing sulfonic groups and quaternised with sulfoalkyl or carboxylalkyl groups. In view of this behaviour we adopted the following strategy. First, we synthesised the hemicyanine with the less reactive indolenine according to the improved methods illustrated previously. These intermediate where then purified, when possible, by extraction of the impurities in an solid-liquid or liquid-liquid extractor. The purified hemicyanine intermediate was then reacted with the more reactive indolenine. Thus the reaction leading to the desired cyanine product was relative fast compared to the dissociation of the hemicyanine back to its starting materials. The products thus obtained were much more pure and their yields also increased significantly. Especially useful was found the combination of a hemicyanine made from a benzoindolenine bearing sulfonic groups and quaternised with a carboxylalkyl chain and an indolenine with sulfonic groups, but quaternised only with simple alkyl chains. This scheme is the opposite of those utilised according to known methods, especially those described in the above mentioned references, where the indocyanine intermediate is always synthesised from the more reactive indolenine, while the less reactive indolenine was added in the cyanine forming step.

In a further extension of this strategy, a more reactive malonaldehyde dianil reagents, 2-chloromalonaldehyde dianil hydrochloride was employed, especially when the indolenine to be reacted with it had very reduced reactivity.

The subject matter of the invention is defined by the appended claims.

In the claims, the term "substituted phenyl" is meant to include preferably phenyl with one or more substituents selected from alkyl and halogen atoms. Alkyl in the claims is preferably $C_1$–$C_6$ alkyl.

The following examples are simply meant to further illustrate specific applications of the present and are not intended to be construed as defining or limiting the scope of the invention.

EXAMPLE 1a

Figure 4:
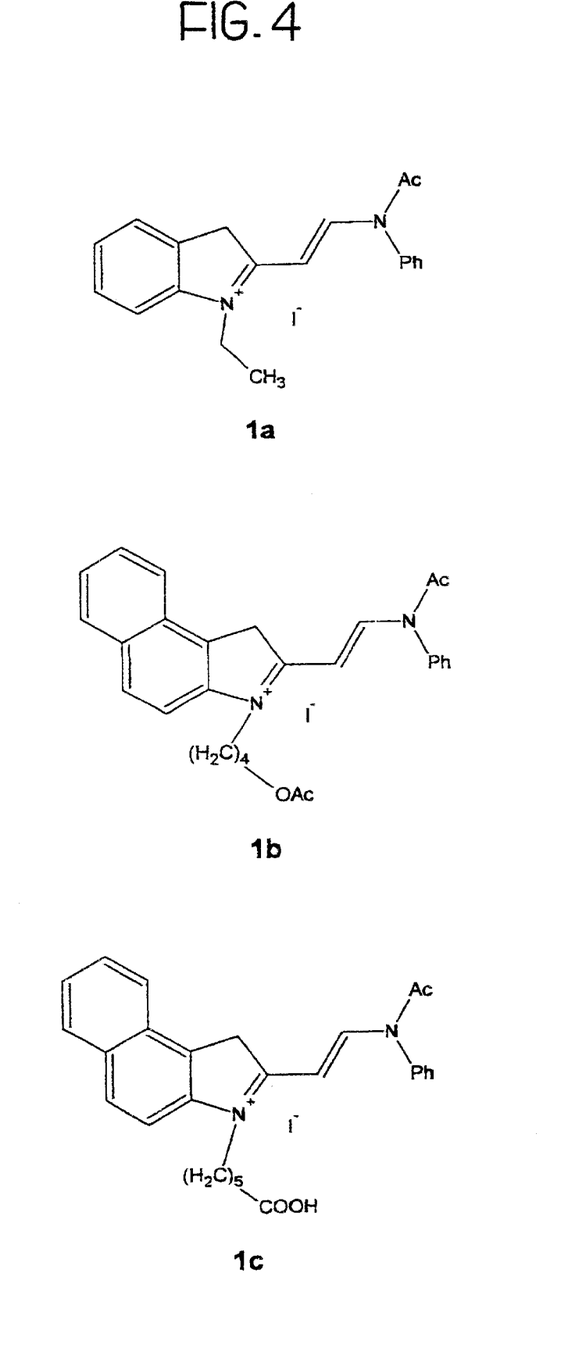
FIGS. 4–11 show the structures and schemes of reactions relating to the compounds of the following examples.

A 100 mL, three-neck flask containing 1.00 g of 1-ethyl-2,3,3-trimethylindoleninium iodide (3.17 mmol), 0.62 g of N,N-diphenylformamidine, (3.17 mmol), 12 mL of acetic anhydride and 1 mL of acetyl chloride was heated at 120° C. for 45 minutes. The orange red solution was evaporated under reduced pressure and the residue dissolved in dichloromethane. The desired product was isolated by precipitation into a large volume of rapidly stirred ether. The product is further purified by flash chromatography, by elution with $CH_2Cl_2$/CH3OH (99:1). The pure product has $\lambda_{max}$ in MeOH at 378 nm and no absorption maxima in the visible region. Yield of 1a was 76%. When the acetyl chloride is omitted a band at 545 nm forms. This band belongs to the symmetric indocarbocyanine dye.

EXAMPLE 1b

A 100 mL, three-neck flask containing 1.00 g of 3-(4'-acetoxybutyl)-1,1,2-trimethylbenzo[e]indoleninium iodide (2.44 mmol), 0.48 g of N,N-diphenylformamidine (2.74 mmol), 12 mL of acetic anhydride and 1 mL of acetyl chloride was heated at 120° C. for 60 minutes. The orange red solution was evaporated under reduced pressure and the residue dissolved in dichloromethane. The desired product was isolated by precipitation into a large volume of rapidly stirred ether. The product is chromatographically pure, with $\lambda_{max}$ in MeOH at 409 nm and no absorption in the visible region. Yield of 1b was 90%. When the acetyl chloride is omitted a band at 572 nm forms. This band belongs to the symmetric indodicarbocyanine dye.

EXAMPLE 1c 2.50 g of 3-(5'-carboxypentyl)-1,1,2-trimethylbenzo[e]indoleninium 6,8-disulfonate monosodium salt (5.5 mmol), 1.2 g of N,N-diphenylformamidine (6 mmol), 15 mL of acetic anhydride mand 2 mL of acetyl chloride in a three-neck 100 mL flask were heated at 120° C. for 2 h. The orange red solution was evaporated to a dark gum. in methanol and re-precipitated into a large volume of ether. This procedure was repeated two more times, until the product was totally purified. Yield of 1c was 65% with $\lambda_{max}$ (MeOH) at 415 nm and no absorption in the visible region. Without the addition of acetyl chloride a symmetric indocyanine forms with $\lambda_{max}$ (MeOH) at 580 nm.

EXAMPLE 2a

Figure 5:
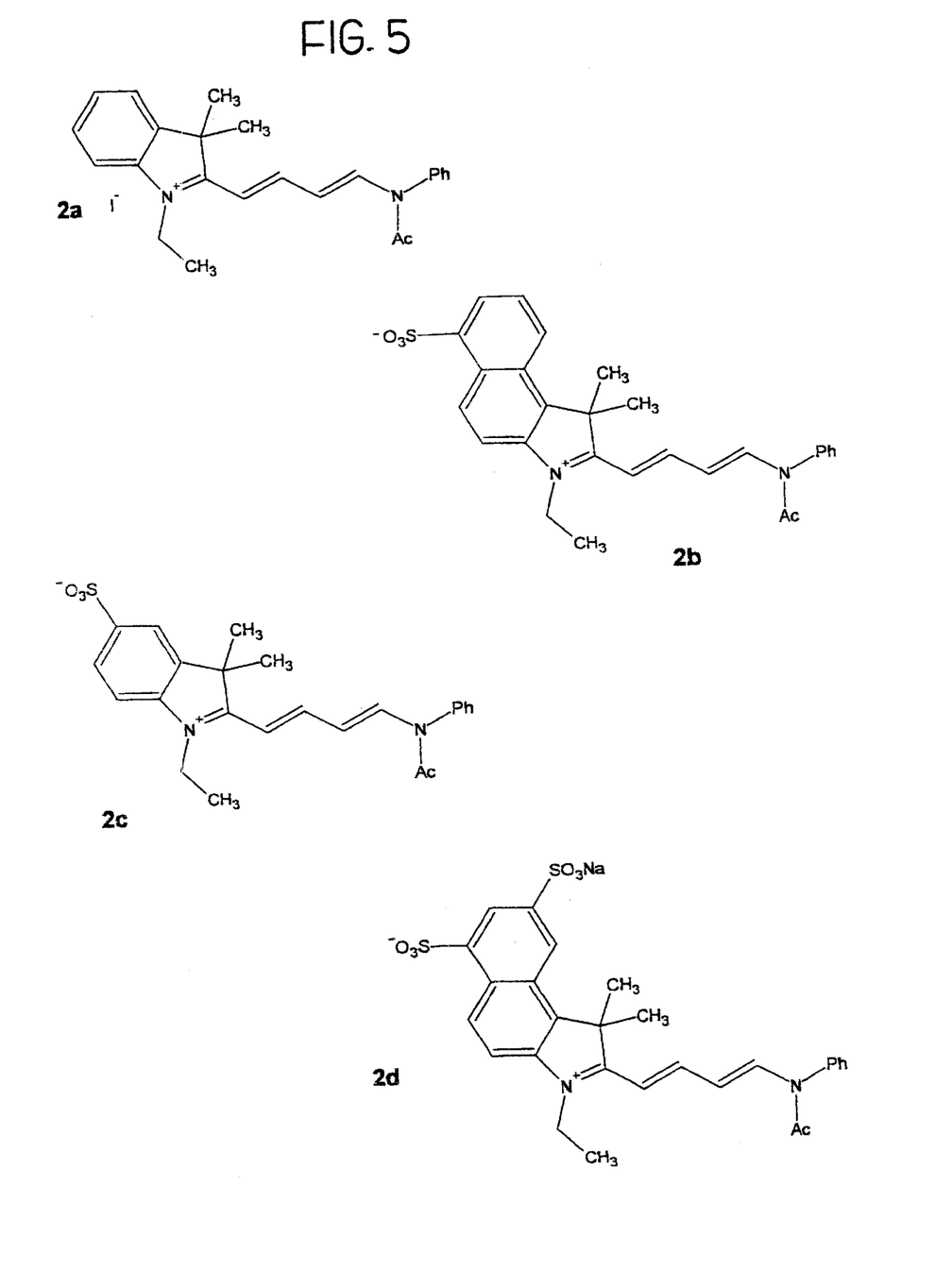

A 100 mL, three-neck flask containing 1.00 g of 3-ethyl-2,3,3-trimethylindoleninium iodide (3.17 mmol), 0.82 g of malonaldehyde dianil (3.17 mmol), 12 mL of acetic anhydride and 1 mL of acetyl chloride was heated at 110° C. for 30 minutes. The orange red solution was evaporated under reduced pressure and the residue dissolved in dichloromethane. The desired product was isolated by precipitation into a large volume of rapidly stirred ether. The product is purified by flash chromatography, by eluting with $CH_2Cl_2$/CHOH, (99:1). The pure product 2a has $\lambda_{max}$ in MeOH at 437 nm and no absorption at longer wavelengths. Yield= 80%.

EXAMPLE 2b 1.00 g of 3-(5'-carboxypentyl)-1,1,2-dimethylbenzo[e]indoleninium 6-sulfonate (2.8 mmol), 0.80 g of malonaldehyde dianil monohydrochloride (3.1 mmol), 20 mL of acetic anhydride and 5 mL of acetyl chloride were heated for 3 h at 120° C. The dark, crude product was purified by Soxhlet extraction with ethyl acetate as the solvent. The purified product 2d has a $\lambda_{max}$ in MeOH at 499 nm and no absorption at longer wavelengths. Yield: 90%.

EXAMPLE 2c 2.00 g of 1-ethyl-2,3,3-trimethylindoleninium-5-sulfonate salt (6.53 mmol), 2.20 g of malonaldehyde dianil monohydrochloride (8.50 mmol), 20 mL of acetic anhydride and 5 mL of acetyl chloride were heated at 100° C. for 1 h. The product was re-precipitated into a large excess of ether or acetone. The crude powder was loaded into a Soxhlet thimble and extracted with ethyl acetate. The purified product 2c has $\lambda_{max}$ in MeOH at 437 nm and no absorption at longer wavelengths. Yield: 81%.

EXAMPLE 2d

A 2-neck 50 mL flask was loaded with 0.35 g of 2-chloromalonaldehyde dianil monohydrochloride (1.19 mmol), 0.50 g of 3-(5'-carboxypentyl)-1,1,2-dimethylbenzo[e] indoleninium 6,8-disulfonic acid monosodium salt (1.19 mol), 10 mL of acetic anhydride and 1 mL of acetyl chloride. The mixture was heated for 2 h at 110° C. The desired product was precipitated as a reddish brown powder by adding the solution drop by drop to 300 mL of rapidly stirred ether. The crude product was purified by liquid-liquid extraction with ethyl acetate Yield of purified hemicyanine 2d: 55%. The absorption maximum of 2d in MeOH is 501 nm.

EXAMPLE 3a

Figure 6:
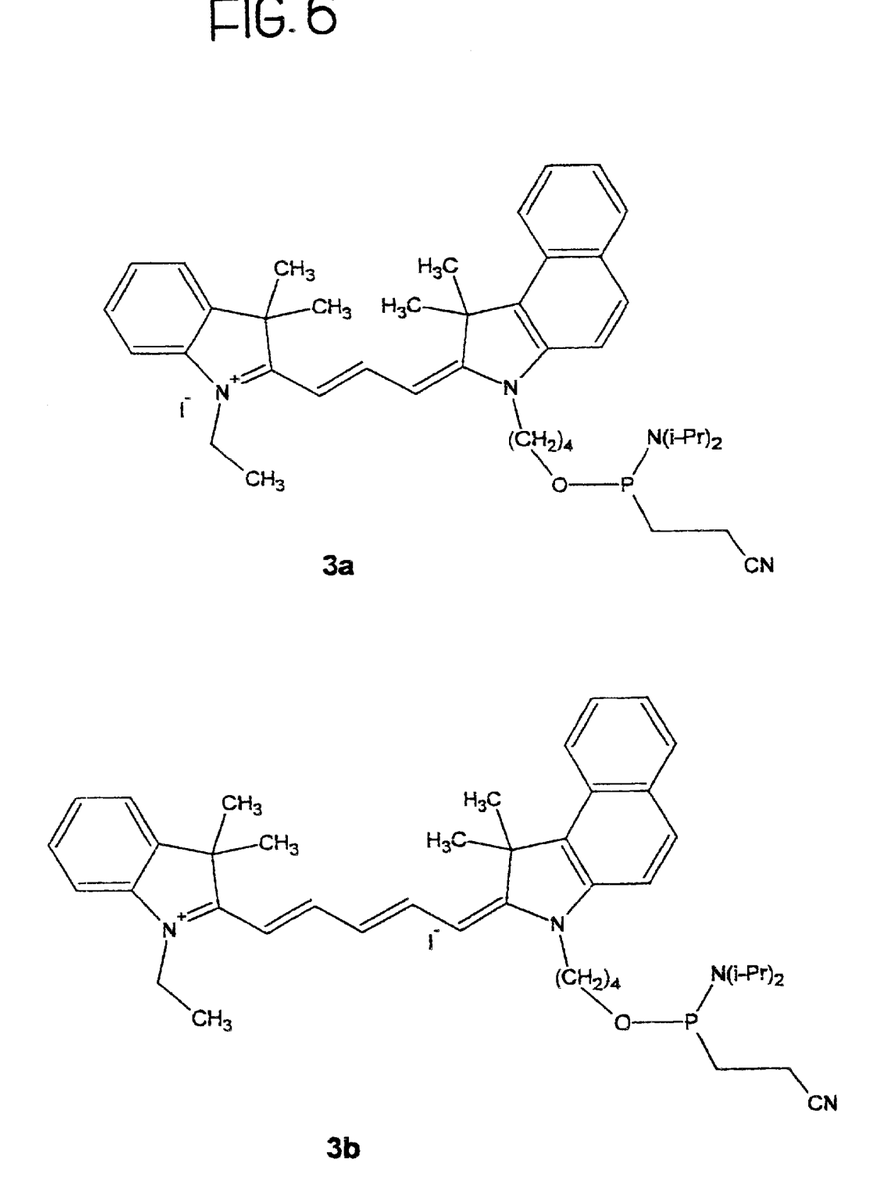

A flask containing 1.00 g of hemicyanine 1b (1.68 mmol), 1.24 g of 1-ethyl-2,3,3-trimethyl-indoleninium iodide (3.94 mmol), 0.28 g of potassium acetate (2.9 mmol) and 40 mL of acetic anhydride was heated at 135° C. for 60 minutes. The red purple solution was cooled to room temperature. Distilled water (50 mL) was added and resulting the mixture was extracted three times with dichloromethane. The organic phase was washed with distilled water, dried with $CaCl_2$ and evaporated under reduced pressure. The residue was dissolved in a small amount of dichloromethane and precipitated into petroleum ether (b.p. 40–60° C.). The resulting purple solid (0.57 g) had a λmax of absorption at 565 nm in MeOH. It was not purified, but it was used as such in the next step (hydrolysis of the acetate protecting group). In a 250 mL flask was loaded with the crude cyanine, 40 mL of methanol and 15 mL of concentrated hydrochloric acid. The resulting solution was stirred at room temperature for 24 hours and then evaporated under reduced pressure. Distilled water was added to the residue. The aqueous solution was extracted with dichloromethane, and the extract was washed with distilled water and dried with $CaCl_2$. The solvent was again evaporated under reduced pressure and then dissolved in a small amount of dichloromethane and then precipitated with a large volume of ether. The crude cyanine alcohol was purified by flash chromatography using a dichloromethane/methanol gradient, from 100% to 90:10. The purified cyanine alcohol was then converted to its phosphoramidite as follows. The cyanine alcohol (0.550 g, 0.91 mmol) was dried in a vacuum oven at 40° C. for five hours and then it was loaded into a dry, 100 mL, 3-neck flask. 40 mL of anhydrous acetonitrile were added under argon, followed by 0.17 mL of a 0.5 M solution of tetrazole in acetonitrile and 0.42 mL of 2-cyanoethyl tetraisopropyl-phosphorodiamidite (1.327 mmol). The solution was stirred under argon for 90 minutes at room temperature. After this time period, it was evaporated in vacuum. The residue was re-dissolved in acetonitrile and precipitated with anhydrous ether, with cooling at 0° C.

The precipitate was washed with dry ether and dried. It was stored at –20° C. Yield of 3a was 90%.

EXAMPLE 3b

A flask containing 1.00 g of hemicyanine 2a (2.06 mmol), 1.52 g of 1-(3'-acetoxypropyl)-2,3,3-trimethylindoleninium iodide (3.94 mmol), 0.28 g of potassium acetate (2.9 mmol) and 50 mL of acetic anhydride was heated at 135° C. for 60 minutes. The blue solution was cooled to room temperature. Distilled water (50 mL) was added and resulting the mixture was extracted three times with dichloromethane. The organic phase was washed with distilled water, dried with $CaCl_2$ and evaporated under reduced pressure. The residue was dissolved in a small amount of dichloromethane and precipitated into petroleum ether (b.p. 40–60° C.). The resulting purple solid (0.61 g) has a $\lambda$max of absorption at 640 nm in MeOH. It was not purified, but it was used as such in the next step (hydrolysis of the acetate protecting group). In a 250 mL flask was loaded with the crude cyanine, 40 mL of methanol and 15 mL of concentrated hydrochloric acid. The resulting solution was stirred at room temperature for 24 hours and then evaporated under reduced pressure. Distilled water was added to the residue. The aqueous solution was extracted with dichloromethane, and the extract was washed with distilled water and dried with $CaCl_2$. The solvent was again evaporated under reduced pressure and then dissolved in a small amount of dichloromethane and then precipitated with a large volume of ether. The crude cyanine alcohol was purified by flash chromatography using a dichloromethane/methanol gradient, from 100% to 90:10. The purified cyanine alcohol was then converted to its phosphoramidite as follows. The cyanine alcohol (0.500 g, 0.88 mmol) was dried in a vacuum oven at 40° C. for five hours and then it was loaded into a dry, 100 mL, 3-neck flask. 40 mL of anhydrous acetonitrile were added under argon, followed by 0.17 mL of a 0.5 M solution of tetrazole in acetonitrile and 0.42 mL of 2-cyanoethyl tetraisopropylphosphorodiamidite (1.327 mmo). The solution was stirred under argon for 90 minutes at room temperature. After this time period, it was evaporated in vacuum. The residue was re-dissolved in acetonitrile and precipitated with anhydrous ether, with cooling at 0° C.

The precipitate was washed with dry ether and dried. It was stored at –20° C. Yield of 3b was 74%.

Figure 7:
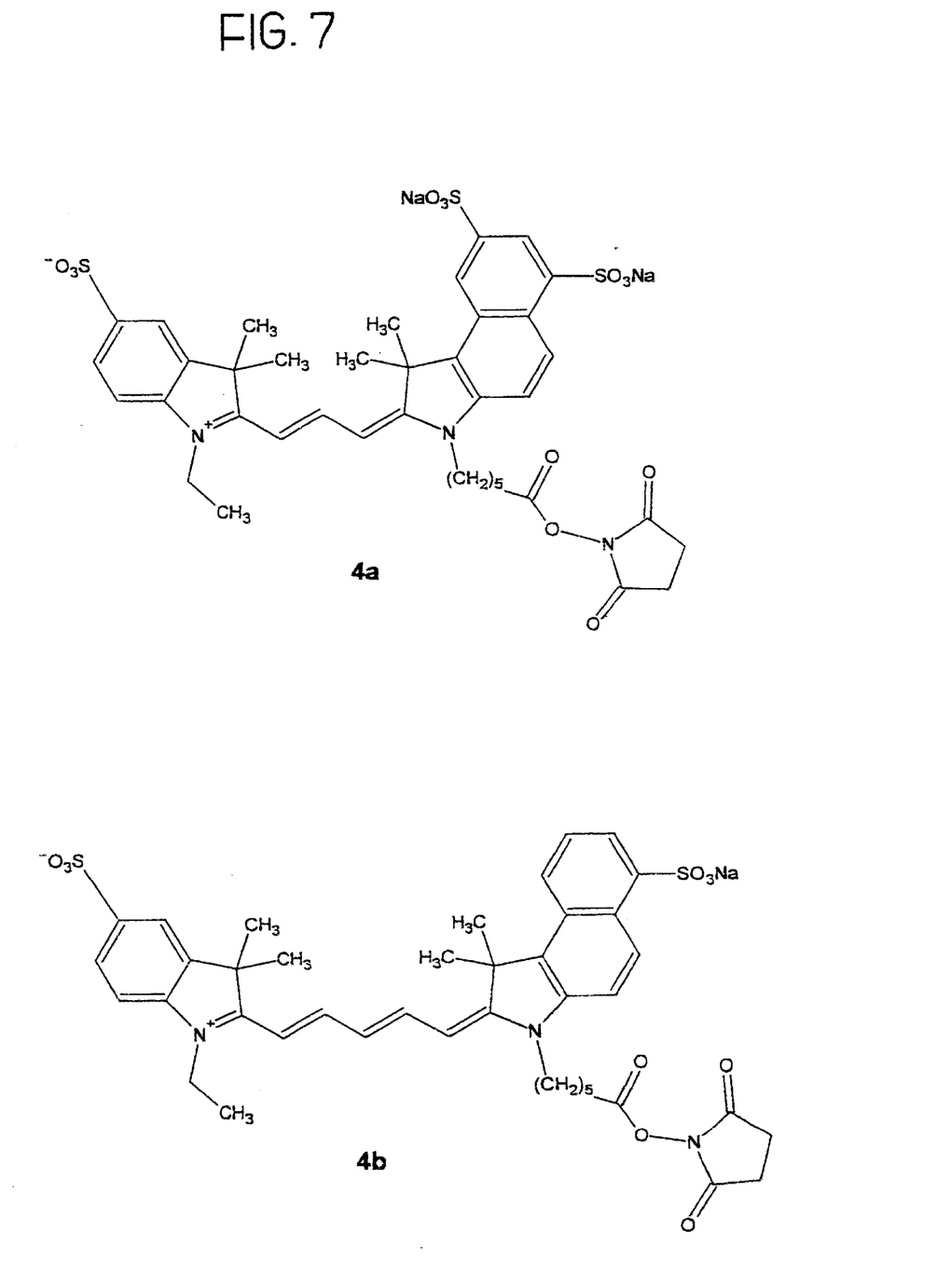

EXAMPLE 4a 0.500 g of hemicyanine 1c (0.767 mmol), 0.243 g of 1-ethyl-2,3,3-trimethylindoleninium 5-sulfonate (0.767 mmol), and 1 mL of triethylamine were dissolved in 7 mL of acetic anhydride. The mixture was heated under reflux at 120–130° C. for two hours. After a few minutes the reaction turned purple red. The mixture was cooled and slowly added to a large volume of rapidly stirred ether. The red precipitate was collected on a filter, washed with ethyl acetate and dried. The product was purified by medium pressure liquid chromatography with acetonitrile/water 50:50 as eluent. The yield of purified product was 73%; its $\lambda_{max}$ in MeOH 570 nm. To prepare the active ester, 50 mg of the acid were dissolved in a microsynthesis vial with 25.6 mg of N,N'-dicyclohexyl carbodiimide (124 mmol), 14.3 mg of N-hydroxysuccinimide (1324 mmol) in 2 mL of dry DMF. The reaction mixture was stirred overnight at about 50° C. The active ester was precipitated with dry ether. The precipitate was collected on a glass filter and washed several times with dry ether. The dried ester 4a is stored at –20° C. Yield of active ester from the acid: 98%.

EXAMPLE 4b 0.500 g of hemicyanine 2c (1.14 mmol), 0.85 g of 3-(5'-carboxypentyl)-1,2,2-trimethyl-benzo[e]-indoleninium-6-sulfonate (2.46 mmol), 0.18 g of potassium acetate (1.82 mmol) were dissolved in 30 mL of acetic anhydride. The reaction mixture was heated under reflux in an oil bath at about 120–130° C. for 60 minutes. After a few minutes the color of the mixture turned blue. The mixture was cooled and then was slowly added to a large volume of rapidly stirred ether. The blue precipitate was collected on a filter, washed with ether and dried. The cyanine dye was purified by medium pressure liquid chromatography, using the mixture acetonitrile/water 60:40. The yield of purified acid was 65%; its $\lambda_{max}$ in MeOH is 660 nm. The acid was then converted to its N-hydroxysuccinimide ester. 50 mg (67 $\mu$mol) of the acid was dissolved in a microsynthesis vial with 27.6 mg of N,N'-dicyclohexyl carbodiimide (134 $\mu$mol), 15.4 mg of N-hydroxysuccinimide(134 $\mu$mol) and 2 mL of dry DMF. All glassware and reagents must be anhydrous. The solution was stirred overnight at 50° C. The active ester 4b was precipitated with ether, collected on a glass filter and washed five times with ether, dried and stored at –20° C. Yield of ester from the acid: 90%.

EXAMPLES 5a AND 5b

Figure 8:
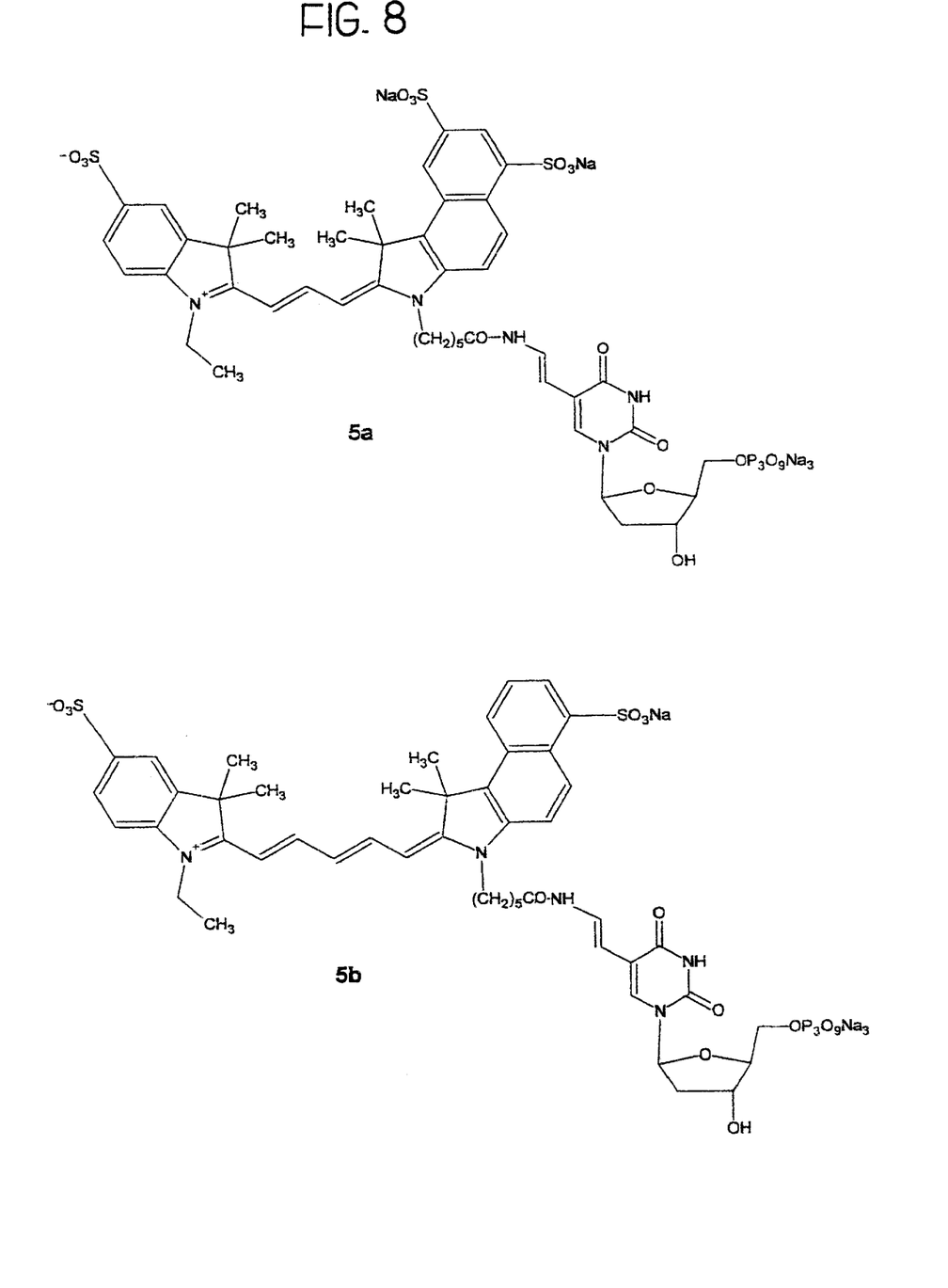

The same protocol was used for the two conjugates 5a and 5b. 2 $\mu$mol of 5-allylamino-dUTP were dissolved in 1.2 mL 0.1 M borate buffer pH 8. 10 $\mu$mol of active ester 4a or 4b dissolved in 300 $\mu$mol of DMF were added to the 5-allylamino-dUTP solution and the mixture was stirred in the dark at room temperature. The reaction was monitored by RP-HPLC (column: Waters Novapack 3.9×150 mm; loop: 20 mL; flow rate: 1 mL/min; program: 15' linear gradient from 100% A to 50% A/50% B, 5' 50% A/50% B, 5' gradient back to 100 A %, with A=water with 0.1% trifluoroacetic acid and B=acetonitrile). The crude conjugate solution was pre-purified by gel filtration chromatography on a 1.5×30 cm, Sephadex G-10 column, with water as eluent. The final purification was by medium pressure liquid chromatography on a Lichroprep RP-18, 20×300 column, with water/acetonitrile 70:30 as eluent. The coupling efficiency was 90% for 5a and 80% for 5b. Absorption maxima in MeOH: 570 nm for 5a and 660 nm for 5b. The conjugates 5a and 5b were stored at –20° C.

Figure 9:
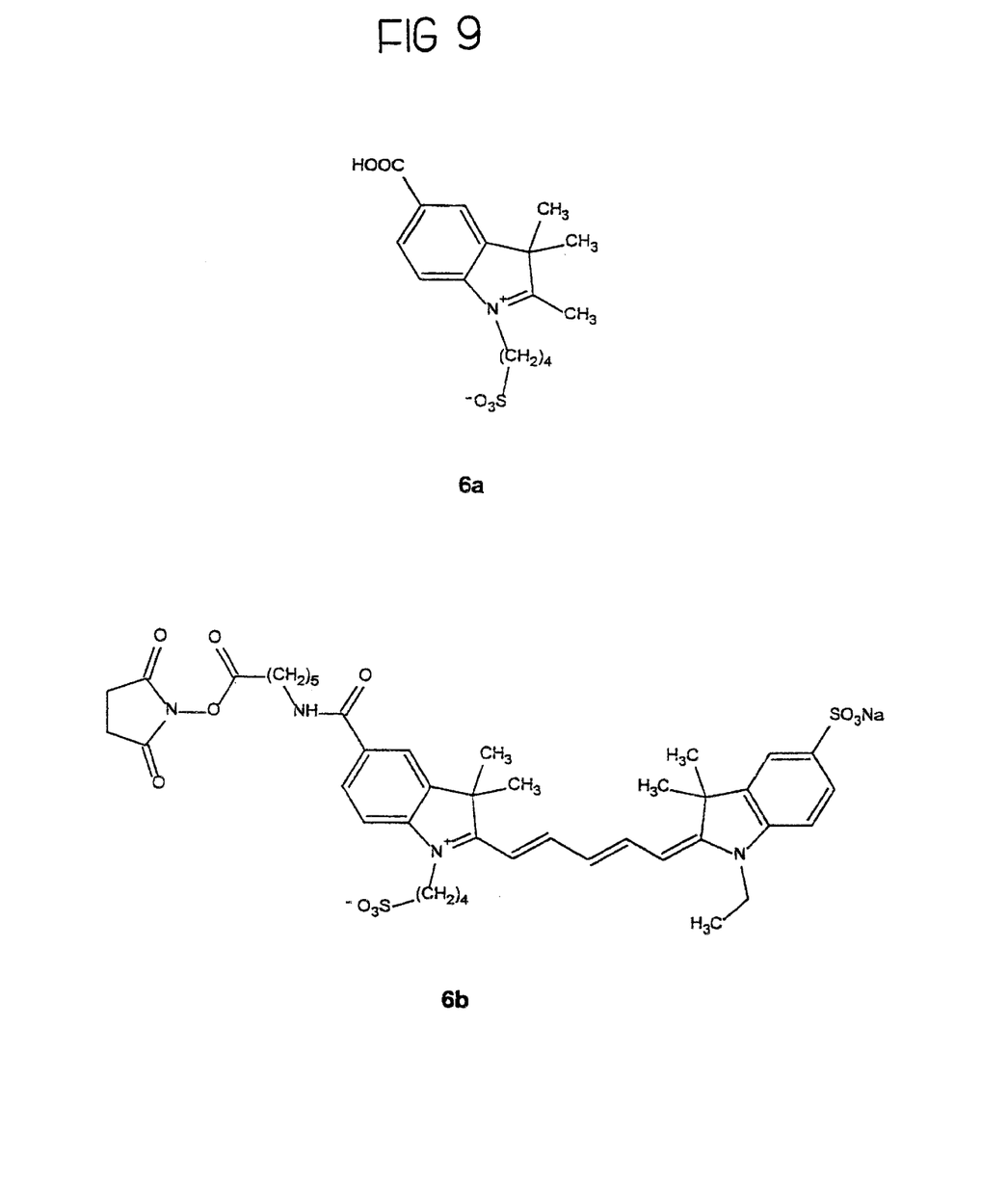

EXAMPLE 6a 10 g of 2,3,3-trimethyl-5-carboxyindolenine were quaternised by heating it in a four fold excess of 4-butanesultone at 120° C. for four hours. The brown solution was cooled and slowly added to a large volume of rapidly stirred ether. A light brown solid separated and was dried in vacuum. Yield of 6a 89%.

EXAMPLE 6b 0.5 g of 1-(δ-sulfonatobutyl)-2,3,3-trimethyl-5-carboxy-indoleninium, (compound 6a) (1.47 mmol), 645 mg of hemicyanine 2c (1.47 mmol), 1 mL of triethylamine and 25 mL of acetic anhydride were heated at reflux for 30 minutes. The resulting blue dye was precipitated into ether. The crude dye was purified by reverse phase medium pressure chromatography on LiChroprep R-18, λmax in MeOH was 646 nm. This compound was activated with triethylchloroformate to its mixed anhydride form. The tert-butyl ester of 6-aminocaproic acid in pyridine was added to the mixed anhydride and the mixture refluxed for 30 minutes. The product was isolated by precipitation with ether. After hydrolysis in dilute hydrochloric acid, the crude acid was purified by RP medium pressure liquid chromatography. The pure acid was then converted to its N-hydroxysuccinimide ester, compound 6b, as previously described.

EXAMPLE 7a

Figure 10:
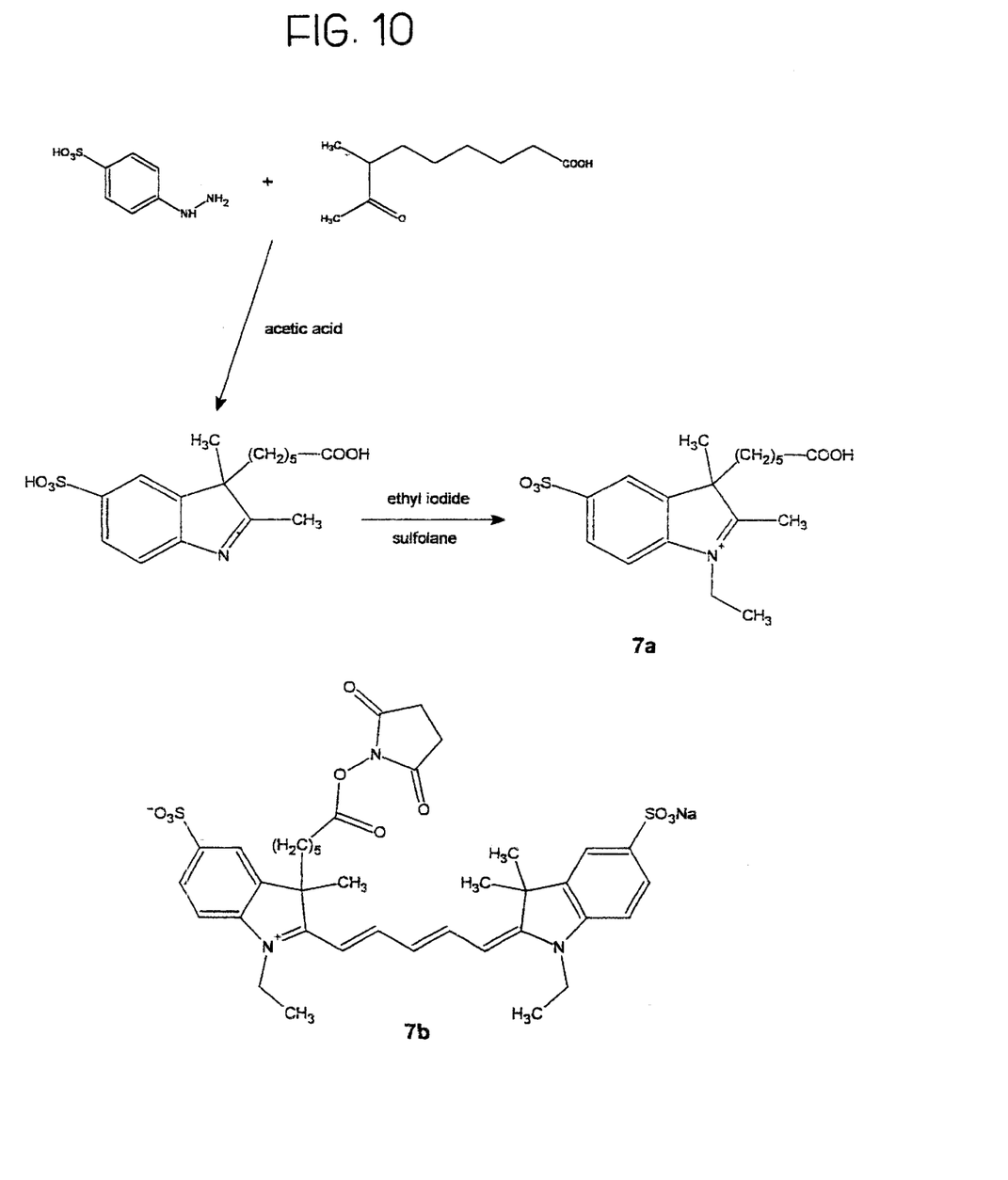

Diethyl 2-acetyl-2-methyl-suberate. Ethyl 2-methylacetoacetate (7.9 g, 60 mmol) was added to a stirred solution of 1.44 g of sodium hydride (60 mmol) in 80 mL of toluene over a 30 minutes period. The resulting solution was heated under reflux for two hours, cooled slightly and treated with ethyl 5-bromohexanoate over a 30 minutes period. The resulting mixture was then heated at reflux for twelve hours, cooled, and the solvent evaporated under reduced pressure. The residue, a yellow oil was used as such in the next step.

7-Methyl-8-oxo-nonanoic acid. Hydrolysis of the crude diethyl 2-acetyl-2-methyl-suberate with concentrated hydrochloric acid gave a quantitative yield of 7-methyl-8-oxo-nonanoic acid.

10.0 g of 4-hydrazino-benzene sulfonic acid (53 mmol) and 9.87 g of 7-methyl-8-oxo-nonanoic acid (53 mmol) in 50 mL of acetic acid were heated at reflux for 3 hours. The mixture was cooled for several hours and the precipitated pink solid was collected on a filter and washed with ether. The resulting crystalline solid was dried in a dessicator over solid KOH for 2 days. Finally, the crude indole was quaternised by heating it with a four fold excess of ethyl iodide in sulfolane at 120° C. for twelve hours. Precipitation with a large volume of ether yielded compound 7a as a reddish powder. Yield 68%.

Compound 7b

The acid 7a, (1.5 mmol), hemicyanine 2c (1.5 mmol), 1 mL triethylamine an 30 mL of acetic anhydride were heated at reflux for 30 minutes. The resulting blue dye was precipitated into ether. The crude dye was purified by reverse phase medium pressure chromatography on LiChroprep R-18, $\lambda_{max}$ in MeOH was 665 nm. It was converted into its N-hydroxysuccinimide ester 7b as previously described.

Compound 8a

Figure 11:
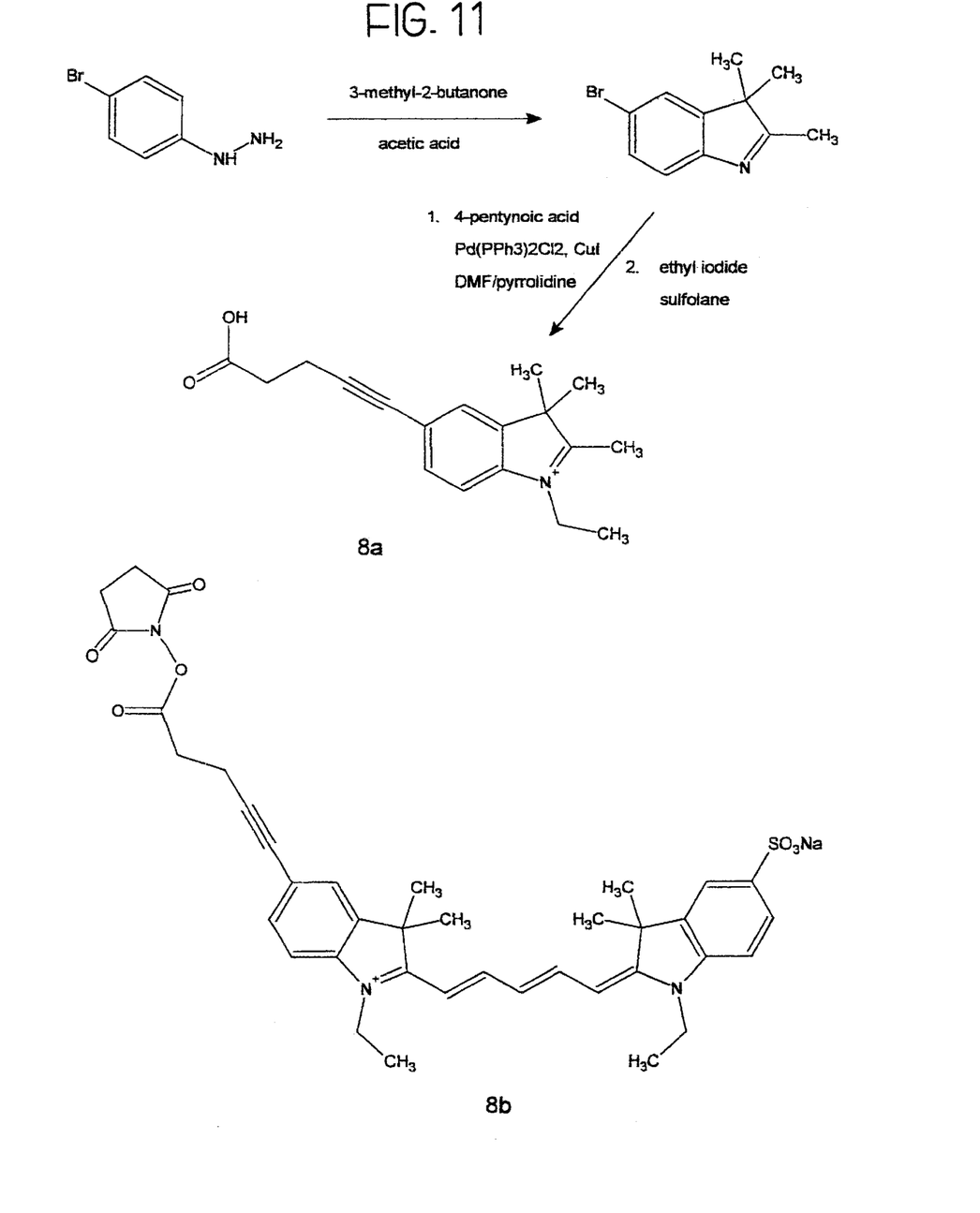

10 g of 5-bromophenylhydrazine (53.5 mmol), 20 mL of 3-methyl-2-butanone and 100 mL of acetic acid were heated at reflux for 4 hours under nitrogen. After removal of the solvent, the red oil was triturated with hexane until it solidified into a pink solid. The crude material was dissolved into dichloromethane and re-precipitated into a large excess of ether. This procedure was repeated twice. The yield of purified indole was 90%. In the next step, the indole (11.43 g; 48.0 mmol), 4.90 g of 4-pentynoic acid (50.0 mmol) and 10 mL of pyrrolidine were stirred in 100 mL of N,N-dimethylformamide under nitrogen at room temperature. Bis(triphenylphosphine)palladium(II) chloride, 0.35 g of copper (I) iodide were then added to the stirred mixture. After three hours, the solvent and volatile components were evaporated under reduced pressure. The crude alkynyl indole was quaternised by heating it with a fourfold excess of 1,4-butanesultone at 130° C. for 3 h. The overall yield of 8a from 5-bromo-2,3,3-trimethylindolenine was 65%.

Compound 8b

The acid 8a, (1.5 mmol) hemicyanine 2c (1.5 mmol), 1 mL of triethylamine an 30 mL of acetic anhydride were heated at reflux for 30 minutes. The resulting cyanine dye was precipitated into ether. The crude dye was purified by reverse phase medium pressure chromatography on LiChroprep R-18, $\lambda_{max}$ in MeOH was 664 nm. It was converted into its N-hydroxysuccinimide 8b ester as previously described.

What is claimed is:

1. A process for preparing an asymmetrical indocyanine dye of the formula

(5a)

or (5b)

comprising the steps of:
a) reacting a first quaternised indolenine or substituted indolenine with a compound of the formula (II)

or hydrochloride thereof,
wherein n is 0 or 1
Ph is phenyl or substituted phenyl X is hydrogen, halogen or alkyl, preferably chlorine,
in a solvent selected from the group consisting of acetic acid, acetic anhydride and mixtures thereof in the presence of 0.5 to 50% v/v acetyl chloride referred to the acetic acid/solvant, to obtain an intermediate hemicyanine, and b) further reacting said intermediate hemicyanine with a second quaternised indolenine or substituted indolenine different from said first indolenine.

2. A process according to claim 1 wherein said first indolenine is less reactive than said second indolenine.

3. A process according to claim 2, wherein said first indolenine bears electron withdrawing groups in the benzene ring.

4. A process according to claim 2, wherein said first indolenine has additional condensed benzene rings.

5. A process according to claim 2, wherein said first indolenine has additional condensed benzene rings bearing sulphonic groups or is quaternised with sulfoalkyl or carboxyalkyl groups.

6. A process according to claim 1, wherein the intermediate hemicyanine from step a) is purified by extraction with a solvent suitable to extract the unreacted compounds of formula (II) without a substantial dissolution of the hemicyanine.

7. A process according to claim 6, wherein said solvent is selected from the group consisting of ethyl acetate and chlorinated organic solvents and mixtures thereof.

8. A process according to claim 7 wherein said solvent is selected from the group consisting of methylene chloride, chloroform, 1,1,1-trichloro ethane and mixtures thereof.

* * * * *